United States Patent
Kostanian

Patent Number: 6,090,352
Date of Patent: Jul. 18, 2000

[54] MULTISTAGE THREE-PHASE EXTRACTOR

[75] Inventor: Artak Eranosovich Kostanian, Leverkusen, Germany

[73] Assignee: Bayer Aktiengesellschaft, Leverkusen, Germany

[21] Appl. No.: 09/043,789

[22] PCT Filed: Oct. 11, 1996

[86] PCT No.: PCT/EP96/04424

§ 371 Date: Mar. 26, 1998

§ 102(e) Date: Mar. 26, 1998

[87] PCT Pub. No.: WO97/14488

PCT Pub. Date: Apr. 24, 1997

[30] Foreign Application Priority Data

Oct. 19, 1995 [RU] Russian Federation ............ 95117738

[51] Int. Cl.$^7$ .................................................. B01D 11/04
[52] U.S. Cl. ......................... 422/257; 210/634; 210/643; 210/511
[58] Field of Search ................................. 422/256, 257; 210/634, 635, 643, 511, 519

[56] References Cited

U.S. PATENT DOCUMENTS 2,290,980  7/1942  MacLean ........................... 422/257 X

FOREIGN PATENT DOCUMENTS 94-015776/26  4/1994  Russian Federation .

*Primary Examiner*—Elizabeth McKane
*Attorney, Agent, or Firm*—Norris, McLaughlin & Marcus, P.A.

[57] ABSTRACT

The multistage three-phase extractor is provided with ports 7, 8 for the supply and ports 10, 11 for the removal of first and second dispersed phases and has contact stages 3 arranged one below the other, which each comprise two interconnected chambers 1, 2 filled with the continuous phase, wherein the first stage is equipped with a dispersing device 5. The first chamber 1 of an upper stage is connected with the second chamber 2 of the stage therebelow. The continuous phase is supplied to the first stage via the port 11 and removed from the last stage via the port 12.

3 Claims, 2 Drawing Sheets

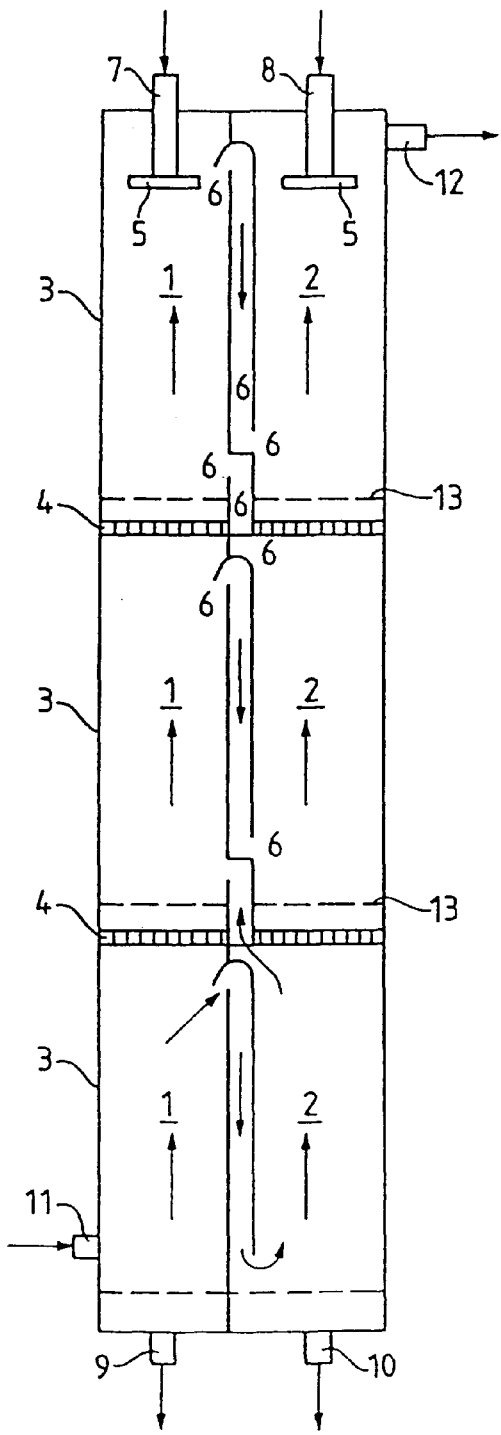
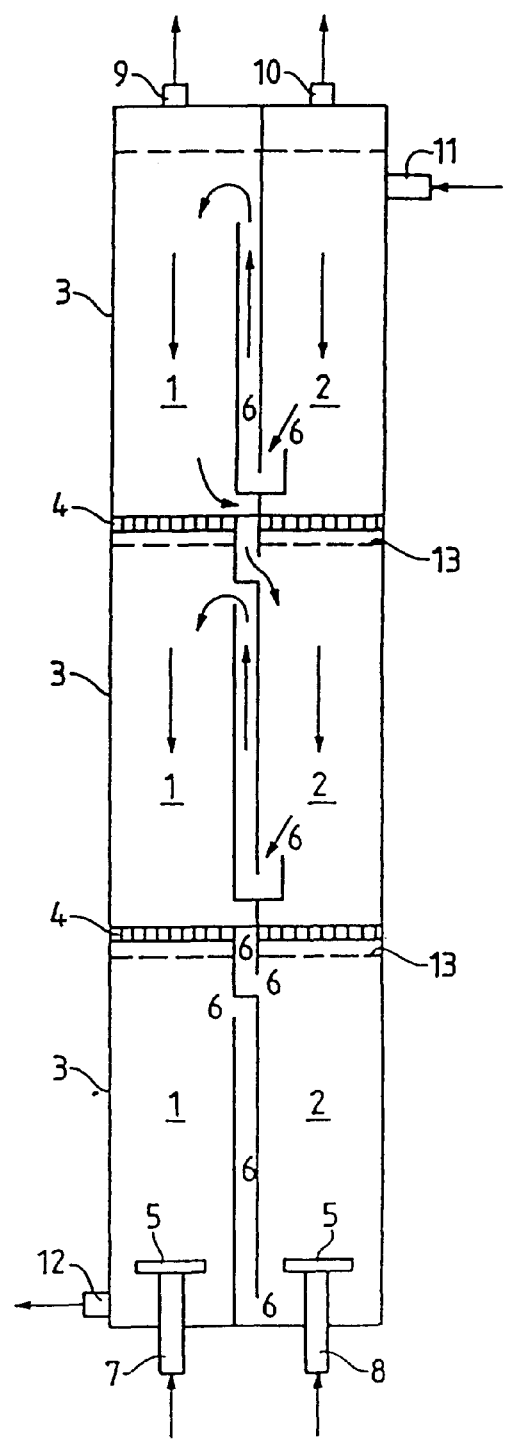

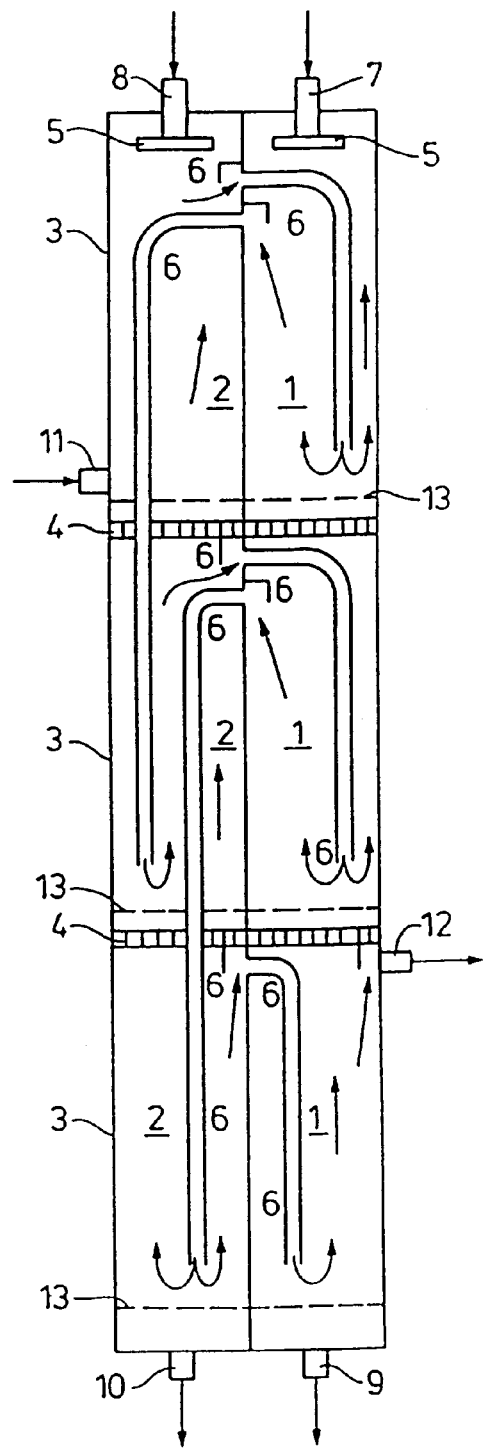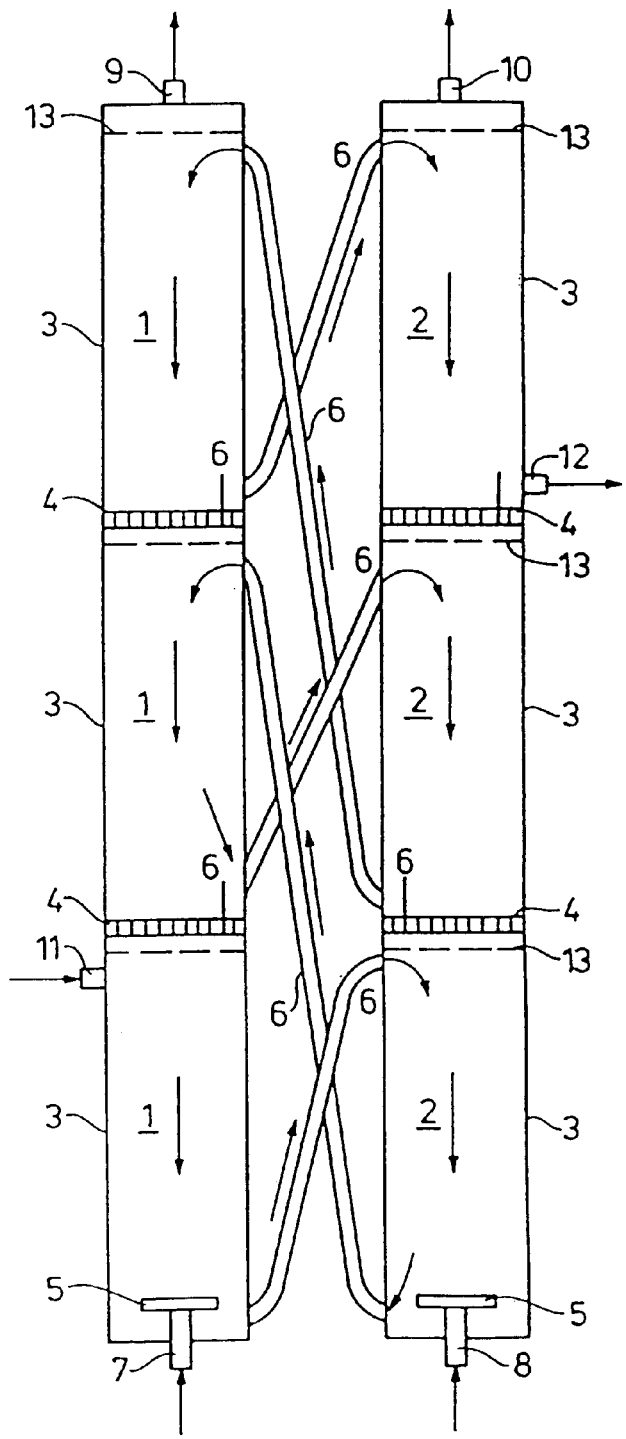

MULTISTAGE THREE-PHASE EXTRACTOR

The invention relates to a multistage three-phase extractor having ports for the supply and removal of first and second dispersed phases and having contact stages arranged one below the other which each comprise interconnected first and second chambers filled with the continuous phase and provided with a dispersing device.

Apparatuses for carrying out processes of three-phase fluid extraction are known in the form of a two-chamber system, wherein the two chambers are connected together at the upper part or comprise a porous partition. The chambers are filled with a continuous phase, through which two dispersed phases, which are not soluble in the continuous phase, are passed in the form of drops. This results in the transfer of substances from one dispersed phase (raffinate phase) via the continuous phase (also known as the liquid membrane phase) into the other dispersed phase (extract phase) (c.f. for example Journal "Theoretische Grundlagen der chemischen Technologie " 1984, Vol. 18; No. 6, pp. 736–738).

These apparatuses are in need of improvement with respect to their performance and their extension to multistage processes.

From a technical point of view, as well as from that of the achievable effect, the three-phase extractor, which consists of a first and second chamber filled with the continuous phase (liquid membrane), is closest to the known apparatuses. The chambers have devices for dispersing the respective phase and are connected together by overflows for circulation of the continuous phase. The overflows take the form of pipes which connect together the upper and lower parts of the chambers. The extractor is provided with ports for the supply and removal of the first and second dispersed phases (Russian patent application no. 94-015776/26 (015406) of 27.04.94).

The phase to be dispersed, i.e. the initial solution, and the solvent (extract phase) are each dispersed into droplets in the appropriate chamber by means of a dispersing device, said droplets moving together through the continuous phase. Owing to the difference in density between the emulsions in the first and second chamber, circulation of the continuous phase occurs through the upper and lower overflows, resulting in transfer of the substance to be extracted from one chamber to the other and from the first phase to be dispersed into the second.

The disadvantage of the known extractor lies in the difficulty in achieving optimum concurrent or countercurrent operation of the phases brought into contact, which may have negative consequences for a series of separation processes.

The object of the invention is to increase the efficiency of the multistage three-phase extractor by establishing the conditions for various flow states of the continuous phases.

Starting with the above-described three-phase reactor, this object is achieved according to the invention in that the first chamber of the upper stage is connected with the second chamber of the stage therebelow and in that the first stage is provided with a port for supply of the continuous phase and the last stage is provided with a port for removal thereof.

Connection of the first chamber of the upper stage with the second chamber of the lower stage and the attachment of ports to the first and last stages for supply and removal of the continuous phase permits different flow states to be produced in the extractor, wherein multiphase contact occurs successively between the continuous phase and the first and second dispersed phases.

The upper part of the first chamber is advantageously connected with the lower part of the second chamber of the same stage and the lower part of the first chamber is advantageously connected with the upper part of the second chamber of the stage therebelow.

Alternatively the lower part of the first chamber may also be connected with the upper part of the second chamber of the same stage and the upper part of the first chamber may be connected with the lower part of the second chamber of the stage therebelow.

The connections between the chambers preferably take the form of separation zones for the dispersed phases.

If the upper part of the first chamber is connected with the lower part of the second chamber of the same stage and the lower part is connected with the upper part of the second chamber of the lower stage, concurrent or countercurrent flow of the continuous phase with the first and second dispersed phases is produced in the extractor.

Connecting the lower part of the first chamber with the upper part of the second chamber of the same stage and the upper part with the lower part of the second chamber of the lower stage permits throughflow of the phases brought into contact in countercurrent operation in the stages and in concurrent operation in the extractor as a whole. The possibility of producing various modes of flow in the multistage three-phase extractor permits the achievement of highly efficient chemical reactive/separation processes.

FIGS. 1–4 are schematic representations of four possible variants of the extractor according to the invention.

FIGS. 1–2 show extractors which operate by the countercurrent method in the individual stages and also in the apparatus as a whole.

FIGS. 3–4 show extractors for carrying out separation processes in which optimum process conditions are achieved by countercurrent operation in the individual stages and concurrent operation in the apparatus as a whole.

FIGS. 1 and 3 show extractors for use in cases in which the densities of the dispersed phases are greater than the density of the continuous phase. In contrast, FIGS. 2 and 4 show extractors in which the densities of the dispersed phases are less than the density of the continuous phase.

The multistage three-phase extractor comprises the first chambers 1 and the second chambers 2, accommodated respectively in the stages 3. The stages 3 are arranged one below the other in the apparatus and separated by perforated plates 4 (sieve plates), which act as dispersing devices. The chambers of the first stage 3 are equipped with dispersing devices 5.

The chambers 1 and 2, which are connected by overflows 6, may be arranged in a housing (FIGS. 1–3) or in two columns (FIG. 4). In each upper stage 3 the first chamber 1 is connected with the second chamber 2 of the lower stage. The two variants a) and b) described below of connections between the chamber 1 and the chamber 2 have proven particularly advantageous:

a) the upper part of the first chamber 1 is connected with the lower part of the second chamber 2 of the same stage 3 and the lower part of the chamber 1 is connected with the upper part of the second chamber 2 of the stage 3 therebelow (FIGS. 1 and 2);

b) the lower part of the first chamber 1 is connected with the upper part of the second chamber 2 of the same stage 3 and the upper part of the first chamber 1 is connected with the lower part of the second chamber 2 of the stage 3 therebelow (FIGS. 3 and 4).

Separation zones are formed at the connections 6 in the form of hydraulic holding layers for the dispersed phases.

The extractor is provided with ports 7 and 8 for the supply and ports 9 and 10 for the removal of the first and second dispersed phases, and with ports 11 and 12 for the supply and removal of the continuous phase.

The principle underlying the operation of the multistage three-phase extractor is as follows:

The chambers 1 and 2 of the stages 3 are filled with the continuous phase. The phases to be dispersed are supplied to the chambers 1 and 2 of the first stage via the ports 7 and 8 and the dispersing devices 5. Depending on the densities of the dispersed phases, the drops move upwards or downwards in the chambers 1 and 2 and coalesce at the phase boundary 13 below or above the perforated plate 4. The dispersion and coalescence processes are repeated in each stage 3. Depending on the desired mode of flow, the continuous phase is conveyed through the port 11 into the chamber 1 (FIGS. 1 and 4) or the chamber 2 (FIGS. 2 and 3) of the first (FIGS. 3 and 4) or last stage (FIGS. 1 and 2). The continuous phase flows through the connections 6 comprising the separation zones and the stages 3 and comes into successive contact with the first and second dispersed phases. The substance is then transferred from one dispersed phase into the other via the continuous phase. The appropriate connection of the chambers 1 and 2 in the stages 3 of the extractor ensures optimum contact between the individual phases. The dispersed phases leave the apparatus via the ports 9 and 10. The continuous phase leaves the extractor via the port 12.

What is claimed is:

1. A multistage three-phase extractor comprising a plurality of contact stages (3), arranged in series one below the other and separated from each other by perforated plates (4), each of which stages has two interconnected chambers (1,2), each of which chambers has a separating zone for a dispersed phase, the chambers of the first or last of said contact stages in said series having dispersing devices (5), said extractor having ports (7, 8) for the supply and ports (9, 10) for the removal of a second dispersed phase, the first and last of said stages having ports (11, 12) for the supply and removal, respectively, of a continuous phase.

2. An extractor according to claim 1, characterized in that the upper part of the first chamber (1) is connected with the lower part of the second chamber (2) of the same stage and the lower part of the first chamber (1) is connected with the upper part of the second chamber (2) of the stage therebelow.

3. An extractor according to claim 1, characterized in that the lower part of the first chamber (1) is connected with the upper part of the second chamber (2) of the same stage and the upper part of the first chamber (1) is connected with the lower part of the second chamber (2) of the stage therebelow.

* * * * *